(12) United States Patent
Niles (10) Patent No.: US 9,570,892 B2
(45) Date of Patent: Feb. 14, 2017

(54) PHOTOGRAMMETRIC METHODS AND APPARATUS FOR MEASUREMENT OF ELECTRICAL EQUIPMENT

(75) Inventor: Martin S. Niles, Stony Plain, CA (US)

(73) Assignee: Cantega Technologies Inc., Edmonton, Alberta (CA)

( * ) Notice: Subject to any disclaimer, the term of this patent is extended or adjusted under 35 U.S.C. 154(b) by 1574 days.

(21) Appl. No.: 12/506,454

(22) Filed: Jul. 21, 2009

(65) Prior Publication Data

US 2011/0019902 A1    Jan. 27, 2011

(51) Int. Cl.
| | |
|---|---|
| G06K 9/00 | (2006.01) |
| H02G 1/00 | (2006.01) |
| G06T 7/60 | (2006.01) |
| H02G 1/02 | (2006.01) |
| G06K 9/20 | (2006.01) |
| H02B 5/00 | (2006.01) |
| B23P 11/00 | (2006.01) |
| G01B 5/02 | (2006.01) |

(52) U.S. Cl.
CPC ............ *H02G 1/00* (2013.01); *G06T 7/602* (2013.01); *H02G 1/02* (2013.01); *G06T 2207/30108* (2013.01)

(58) Field of Classification Search
CPC ........ G01C 11/00; G06T 7/0018; G06T 7/602; G06T 2207/30108; H01B 17/42; B66C 23/88
See application file for complete search history.

(56) References Cited

U.S. PATENT DOCUMENTS

| | | | |
|---|---|---|---|
| 5,153,383 A | 10/1992 | Whited et al. | |
| 5,485,307 A | 1/1996 | Kim | |

(Continued)

OTHER PUBLICATIONS

"Overview of 3D Photogrammetry", Assurgent Technology Solutions Pvt. Ltd, downloaded from http://www.assurgenttechno.com at least as early as Nov. 2008.

(Continued)

*Primary Examiner* — Ryan Zeender
*Assistant Examiner* — Dana Amsdell
(74) *Attorney, Agent, or Firm* — Anthony R. Lambert (57) ABSTRACT

A method is disclosed comprising: imaging a feature of a component of an electrical power transmission system for example in combination with a reference component or feature of known dimensions, the reference component or feature comprising a reference, to produce one or more images; analyzing the one or more images with a photogrammetry algorithm to measure the feature of the component; and placing a protector at least partially over the component, the protector being selected to fit the component based on the measurement of the feature. In some embodiments the method may further comprise making the protector based on the measurement of the feature. A method is also disclosed comprising: remotely placing a reference object into a position that is inside a safe Limit of Approach and in the vicinity of a feature of a component of an energized live electrical power transmission system, the reference object comprising a reference; imaging a combination of the reference and the feature of the component to produce one or more images; and analyzing the one or more images with a photogrammetry algorithm to measure the feature of the component.

5 Claims, 7 Drawing Sheets

(56) References Cited

U.S. PATENT DOCUMENTS

| | | | |
|---|---|---|---|
| 7,023,468 B2* | 4/2006 | Chikahisa et al. | 348/144 |
| 7,085,672 B2 | 8/2006 | Ishii et al. | |
| 7,293,368 B1* | 11/2007 | Faulk et al. | 33/758 |
| 8,923,650 B2* | 12/2014 | Wexler | G01C 11/04 382/286 |
| 9,230,339 B2* | 1/2016 | Wexler | G06T 7/602 |
| 9,440,368 B2* | 9/2016 | Birch | B23D 45/003 |
| 2002/0146164 A1* | 10/2002 | Chikahisa et al. | 382/154 |
| 2007/0168153 A1* | 7/2007 | Minor | G01B 11/02 702/158 |
| 2008/0123254 A1* | 5/2008 | Niles | H02G 7/00 361/602 |
| 2009/0230027 A1 | 9/2009 | Zaid | |

OTHER PUBLICATIONS

"Photomodeler Software—Main Features", Eos Systems Inc., downloaded from http://www.photomodeler.com/products/photomodeler.htm at least as early as Nov. 2008.

"Photomodeler Brochure", Eos Systems Inc., downloaded from http://www.photomodeler.com at least as early as Nov. 2008.

\* cited by examiner

PHOTOGRAMMETRIC METHODS AND APPARATUS FOR MEASUREMENT OF ELECTRICAL EQUIPMENT

TECHNICAL FIELD

This document relates to photogrammetric methods and apparatus for the measurement of electrical equipment.

BACKGROUND

Long-distance electricity transmission is typically carried with high voltage conductors. Transmission at higher voltages reduces resistance power loss, therefore line voltage for long distance lines is stepped up after generation by passing it through transformer stations prior to feeding the power to long-distance transmission lines. Transmission lines traverse large regions and require numerous support towers. The conductors in high tension power lines are typically uninsulated because of the cost and additional weight of insulated versus uninsulated conductors.

Electric poles, towers, and other electrical equipment including substations provide attractive roosts for birds, particularly in treeless regions. If the wings of a bird simultaneously contact a conductor and another object such as an adjacent conductor, support tower or tree, the resulting electrical short-circuit can kill the bird and also damage the power system. The electrical short can further cause electrical system damage resulting in power outages. Because large (and typically protected) birds are more susceptible to such incidental contact, electrocution hazards disproportionately affect large bird species such as raptors.

Substations transform power from transmission voltages to distribution voltages (typically ranging from 2400 volts to 37,500 volts). Distribution voltages allow for reduced system clearances. These reduced clearances between phase to ground and phase to phase, increase station susceptibility to bird or animal caused outages. Faults caused by birds and other animals often trigger sensitive relay protection schemes, resulting in substation lockouts, interrupting service to thousands or possibly tens of thousands of customers and at the same time damaging expensive substation equipment.

Thus, in the field of electrical power transmission and distribution there is a need to insulate electrical power systems from short circuits caused by birds and other animals. The variety and number of proposed solutions for repelling birds and other animals from electrocution risks highlights the persistence and magnitude of the problems created by such undesirable intrusion. Many different types of scarecrows and other moving devices have been developed to repel birds. In addition to moving devices, various physical structures often involving spikes or other physical barriers, have been developed to discourage birds from roosting on structures. Other bird repelling concepts use electricity or magnetic fields to discourage bird intrusion. Equipment shield and cage devices have been specifically designed to block birds and other animals from accessing and short-circuiting electrical leads, such as described in U.S. Pat. Nos. 5,153,383 and 5,485,307.

The inventor's own prior patent document discloses protectors for components of electrical power transmission systems, see United States patent publication no. 20080123254, as well as methods of making such protectors. These covers are made by spray molding dielectric materials. However, the process of making and installing these components can be costly. Firstly, in order to make a suitable mold for such a cover, accurate measurements must be made of the component itself. This involves taking a physical measurement that requires an on-site visit and usually a power-down of the electrical system, both of which add to the cost of producing the covers and protecting the electrical equipment.

Power downs for the purpose of measuring electrical equipment for protective covers can keep a system down for a half a day or longer time period, at great cost. Some systems are operated under the direction of a regulatory and scheduling authority that controls the system's downtime scheduling. In locations with minimal spare power transmission capacity, it can be a challenge for a system to get the downtime needed to measure its equipment.

Making accurate hands-on measurement of power equipment for close-fitting protective covers requires training and skill. Because electrical systems are usually scheduled for maintenance downtime on a fairly short notice (typically a week for non-emergency situations), and because scheduled downtime may be cancelled by the Regulatory Authority on an extremely short notice, there is no guarantee that a suitable expert will be available to take the required measurements during a system's available downtime period. As a result, a system can experience significant delays in protecting their equipment.

Further, electricity transmission systems are built using components made by a number of different manufacturers assembled in an almost infinite variety of configurations, creating variations in final system dimensions from site to site, such that in many cases custom molds are required in order to create a suitable cover. It is possible to reduce the cost associated with protecting such electrical systems by using a generic mold to make an approximately suitable cover for each component, but the end result is typically a looser-fitting and hence less effective cover.

Thus, there is a need for methods that reduce the costs of producing and installing effective, close-fitted covers. Specifically, there is a need for a method of accurately determining the dimensions of electrical equipment to allow measurements to be obtained from energized equipment by a person positioned outside the Limits of Approach.

SUMMARY

A method is disclosed comprising: imaging a feature of a component of an electrical power transmission system to produce one or more images; analyzing the one or more images with a photogrammetry algorithm to measure the feature of the component; and placing a protector at least partially over the component, the protector being selected to fit the component based on the measurement of the feature. In some embodiments the method may further comprise making the protector based on the measurement of the feature.

A method is also disclosed comprising: remotely placing a reference object into a position that is inside a safe Limit of Approach and in the vicinity of a feature of a component of an energized electrical power transmission system, the reference object comprising a reference; imaging a combination of the reference and the feature of the component to produce one or more images; and analyzing the one or more images with a photogrammetry algorithm to measure the feature of the component. The reference object may be a three dimensional object of known dimensions. Some embodiments may further comprise placing a protector at least partially over the component, the protector being selected to fit the component based on the measurement of the feature. In some embodiments the method may further comprise making the protector based on the measurement of the feature.

A method is disclosed comprising: placing a reference object of known dimension, such as a linear scale, in the vicinity of a feature of a component of an energized electrical power transmission system, the reference object of known dimension comprising a reference; imaging a combination of the reference and the feature of the component to produce plural images; analyzing some or all of the images with a photogrammetry algorithm to measure the feature of the component; and placing a protector at least partially over the component, the protector being selected to fit the component based on the measurement of the feature. In some embodiments the method may further comprise making the protector based on the measurement of the feature.

In some embodiments, a method is disclosed for accurately determining equipment dimensions on live (energized) electrical equipment by a user who is outside the Limits of Approach.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims. Dotted lines are used in the drawings to indicate the field of view of an imaging device. The figures are understood to be not drawn to scale.

Figure 1:
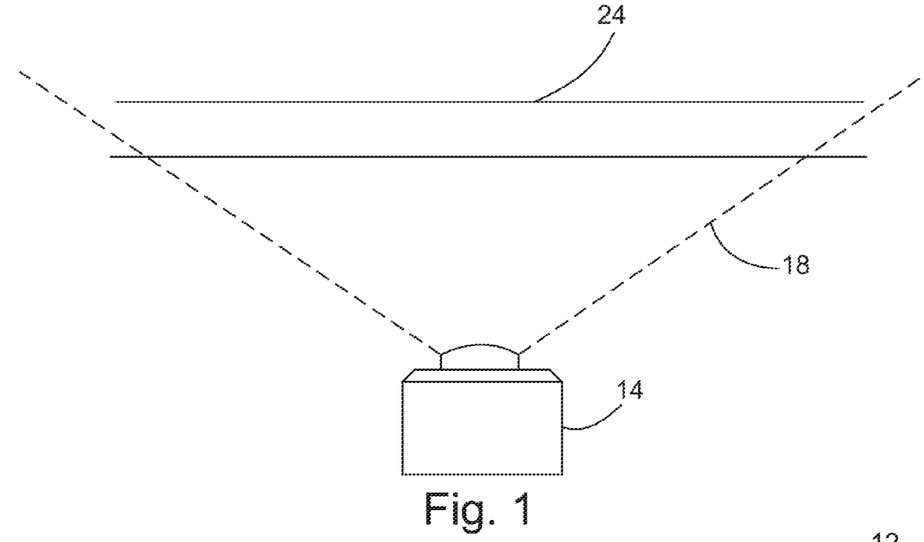
FIG. 1 is a side elevation view of an imaging device and a component of an electrical power transmission system.
Figure 2:
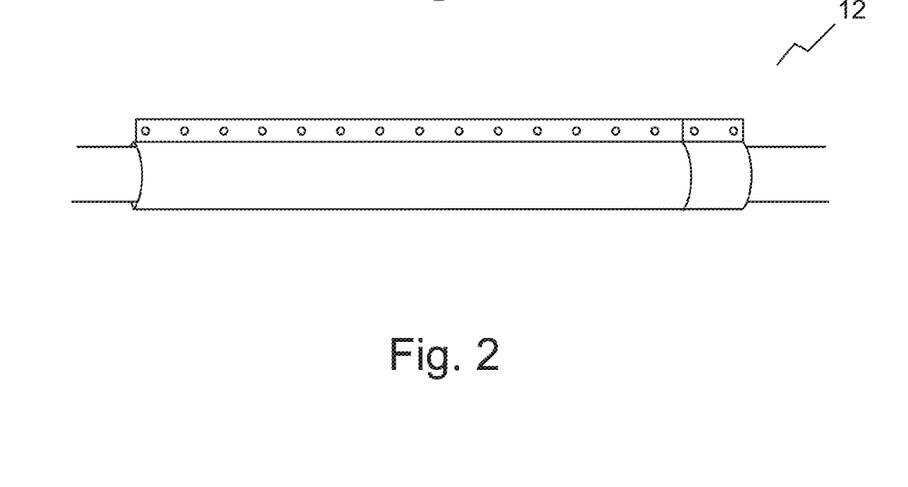
FIG. 2 is a side elevation view of the component of FIG. 1 fitted with a protector.
Figure 5:
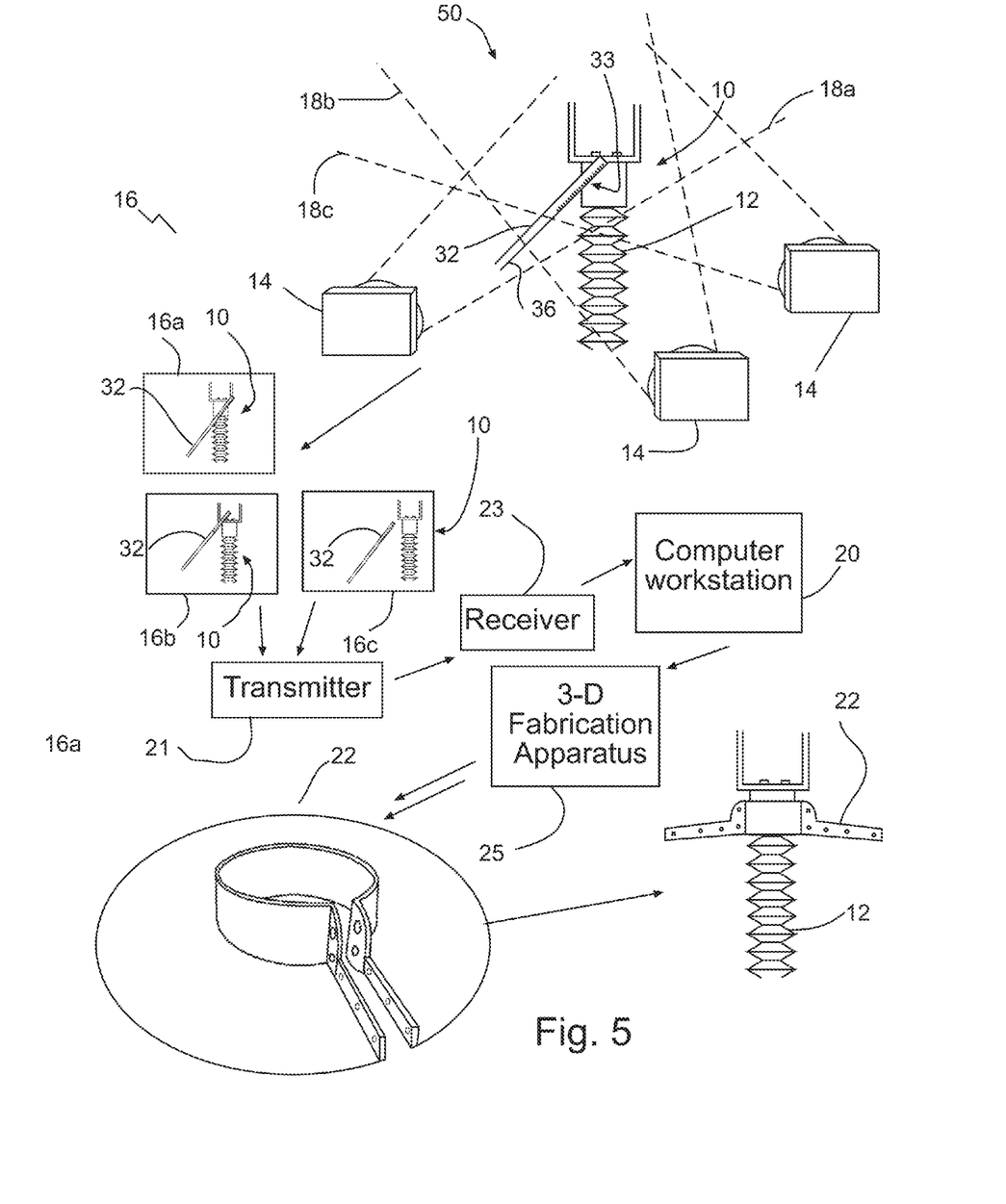
FIG. 5 is a flow diagram that illustrates a method of protecting a component as disclosed herein.
Figure 7:
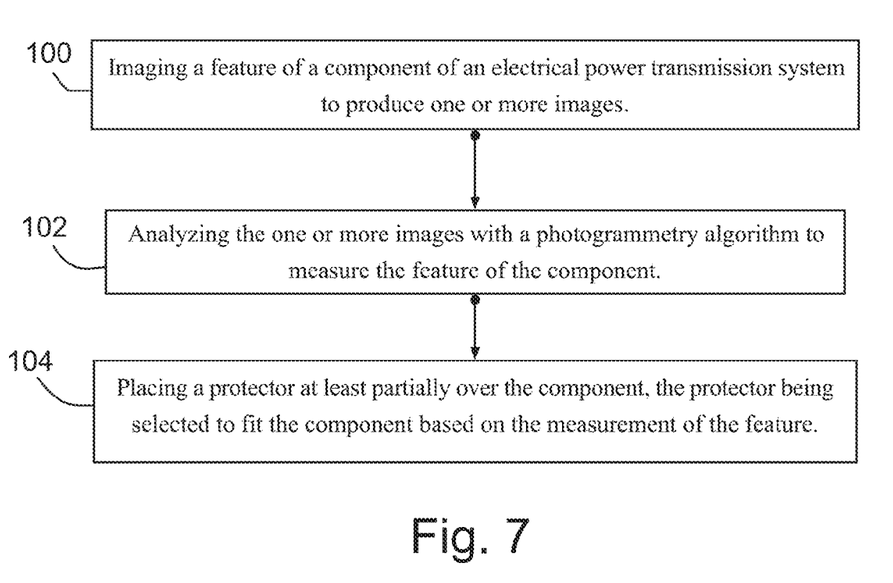
FIGS. 7 and 8 are various flow diagrams of methods as disclosed herein.

Referring to FIG. 7, a method is disclosed for protecting a feature of a component of an electrical power transmission system. Referring to FIG. 5, in a stage 100 (shown in FIG. 7) a feature, for example an insulator 10, of a component 12 of an electrical power transmission system is imaged, for example with an imaging device such as a camera 14, to produce two or more images 16, for example images 16a, 16b, and 16c. Referring to FIGS. 1 and 2, an example of a method is illustrated where only a single image is taken, in this case where the feature is a pipe 24 from a bus support (not shown). Although the use of a single image directly provides only two-dimensional measurements, three-dimensional measurements may be derived indirectly from the analysis of such an image. For example, the pipe 24 of FIG. 1 is known to have a circular cross-section, and thus a single image taken at a known focal length can yield sufficient dimensional information. A fixed focal length camera may be used for this purpose. Single-image analysis may be used to select protectors that are blankets, pipe covers, and covers for objects that are symmetrical about 360 degrees.

Figures 9, 10A, 10B:
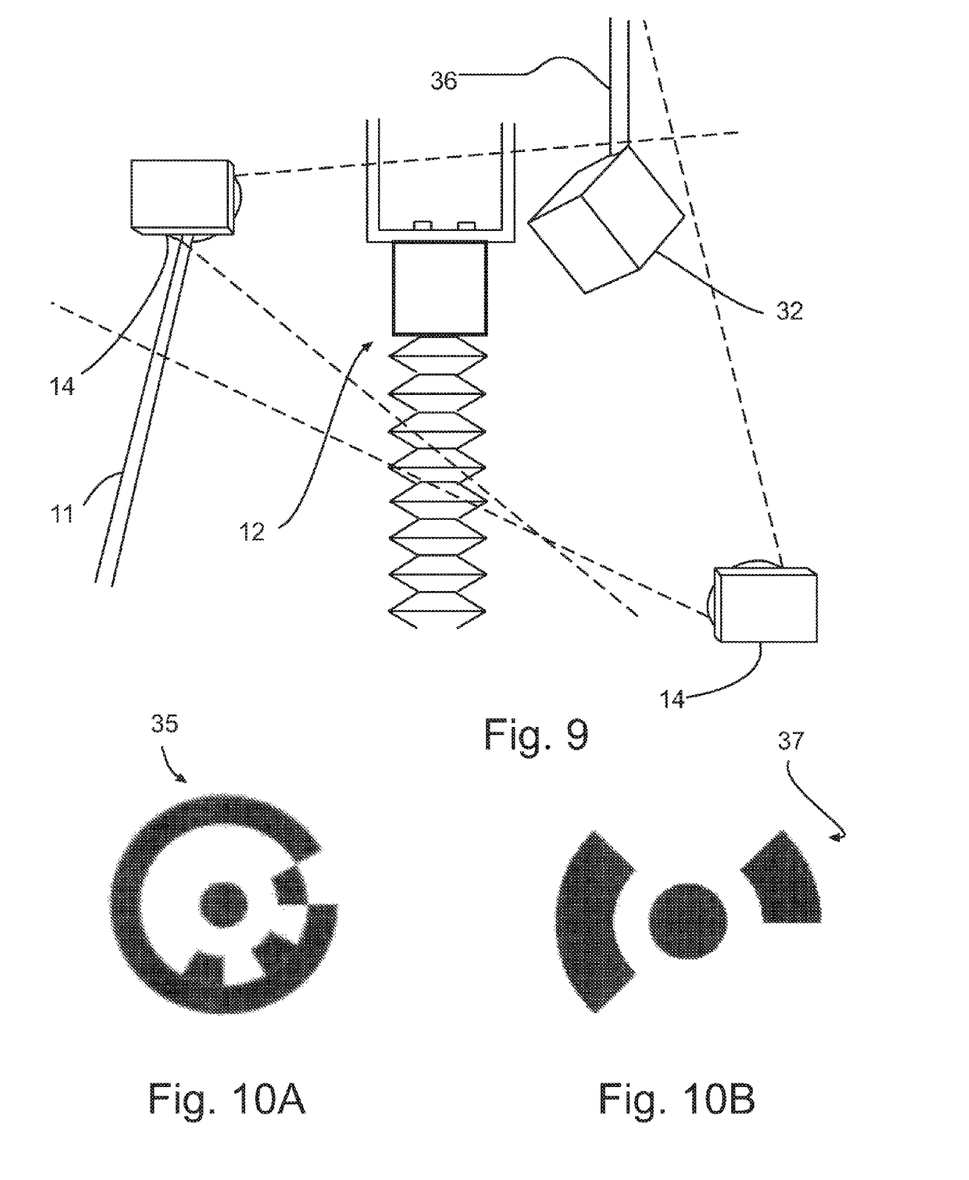
FIG. 9 is a perspective view of a reference object suspended adjacent a component of an electrical power transmission system.
FIGS. 10A and 10B are examples of coded ringed and non-ringed targets, respectively, to be used as references in some embodiments of the methods disclosed herein.

Referring to FIG. 9, in some embodiments the one or more images comprise at least two images of the feature of the component taken from different respective angles. Referring to FIG. 5, in most cases two or more images must be taken to get adequate three-dimensional measurements. In addition, more than two images may be required at different angles for non-symmetrical equipment, in order to allow the suitable number of dimensions to be measured. For example, a bushing that is non-symmetrical about a vertical axis may require images from the front, back, and sides for adequate measurement. Additional redundant images may also be taken in order to ensure that a sufficient number of usable images have been taken in the imaging step from which useful measurement data may be derived from in the analyzing step. Referring to FIG. 5, images may be collected for example with the imaging device at one or more levels, such as ground level (the camera 14 in the middle) or an elevated position (the cameras 14 on the right and left). Examplary images 16a, 16b, and 16c are illustrated after having been taken of field of views 18a, 18b, and 18c respectively.

Figure 3:
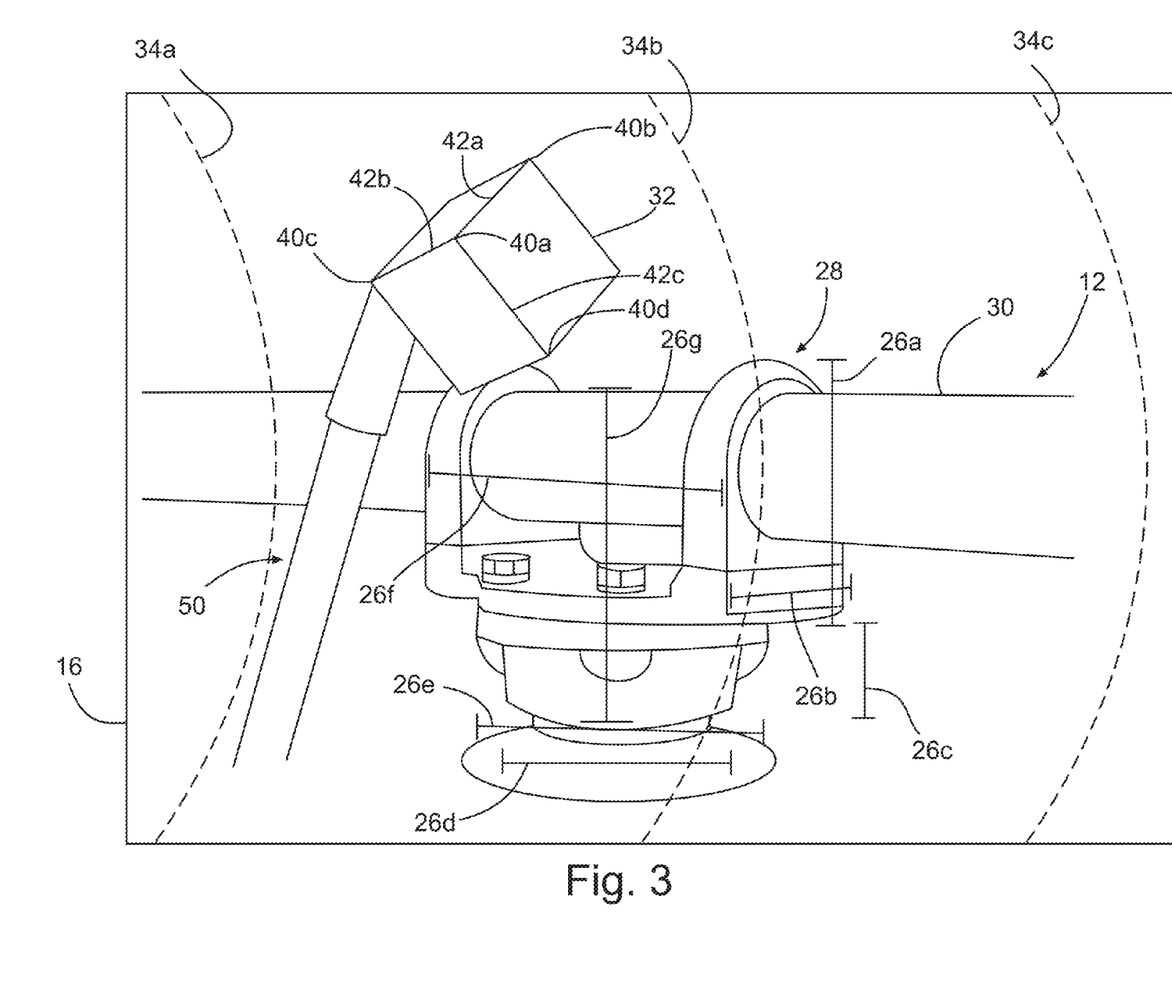
FIG. 3 is an image from an imaging device that illustrates a perspective view of a reference object and a component of an electrical power transmission system.

In some embodiments such as that indicated in stage 100b of FIG. 8 (discussed below) imaging further comprises imaging a combination of a reference, for example located as at least part of a reference object 32, and the feature, such as insulator 10. The image may include other components as necessary, for example adjacent structure. The reference may be any suitable reference or references, for example one or more of a scale, and a geometrical feature of known dimensions. Referring to FIG. 3, an externally introduced three-dimensional reference object 32 may contain a sufficient number of references, such as faces, edges, or distance between points, of a known dimensional value or labeled with unique identification information, such that a user is able to identify the known dimension associated with an imaged reference and positively determine the orientation of the reference object 32 in space. In general, the reference object 32 should have distinctly identifiable reference points that are identifiable in the set of analyzed images. A three-dimensional reference object 32 may have three known dimensions that are resolvable into a rectilinear coordinate system, and may be for example a component of the electrical power transmission system that is accurately measured and in the vicinity of the feature. In some embodiments, the reference and the feature may have the same position relative to one another in each of the one or more images, for example the set of images 16a, 16b, and 16c used together for the analysis stage. Same position relative to one another refers to the fact that when taking each of the images, the reference and the feature do not move in space relative to one another.

The reference object 32 comprises the reference, and may be remotely placed in the vicinity of the component 12. The reference object 32 may have a suitable three-dimensional shape, for example a polyhedron, T-shape prism (not shown), a cuboid, and a rectangular prism (shown in FIG. 6), which may further be a cube (shown in FIG. 3). In some embodiments, the object 32 may be rectilinear, and further may comprise right-angled edges. The reference object 32 may be made at least in part of a dielectric material, for example dielectric polymer such as polyurethane, or wood. In some embodiments, the reference object may be used as a reference from any angle, for example if the reference object is three-dimensional and all dimensions are known.

Referring to FIGS. 10A and 10B, the reference object 32 or objects may comprise one or more coded targets, such as targets 35 and 37 as references. Coded targets, which are high contrast targets such as circular targets, may be placed to provide accurate sub-pixel point marking. Coded targets may be circular, ringed, and semi-ringed targets, with optional additional bits, that may be automatically recognized by a photogrammetry software program or a suitable algorithm. This allows for automated referencing, since the reference dimensions of the coded target are recognized by the algorithm according to the exact shape of the target. This allows referencing to occur even before a project has been processed, or in situations where the component has a complex scene or shape. Coded targets are examples of reference objects that can be applied as natural light and reflective stickers, coatings, projections, or drawings. Other reference objects 32 may be applied in this fashion. Plural coded targets may be used to improve the effectiveness at the analysis stage. Coded targets may be in the form of ringed automatically detected targets, such as target 35, and non-ringed coded targets, such as target 37 for example. Coded targets may be used to automate three dimensional point measurement, increase the speed at which analysis can be carried out, and reduce the number of incorrectly referenced points. Other referencing techniques may be used, such as automatic referencing.

Referring to FIG. 5, the reference object 32 may comprise a scale, such as a linear scale 33. The reference object 32 may also comprise a clearance stick as shown. The use of a clearance stick as a reference object 32 with scale 33 is advantageous because clearance sticks are cleared for live use and thus require no additional clearance or testing before they may be used on energized systems. Stage 100 or 100b may be carried out in FIG. 5 after placement of the scale 33. The imaging step may be carried out by obtaining an image set, such as images 16a, 16b, and 16c, that includes a minimum of three clear images of the features of interest, which in this case is insulator 10. Additional shots, for example six to twelve additional shots, may be taken at a variety of angles to ensure that enough data is available should one of the three main shots not be usable for some reason. Images, such as photos, may be taken at exemplary angles of 25-30 degrees apart. Separations between the positions where each image is taken may be horizontal, vertical, or a combination of horizontal and vertical distances. The greater the number of points of the imaged component that are visible in plural images, the more effectively the images can be tied together in the analysis stage to yield useful results. It should be understood that some or all of the images taken may be used in the analysis stage. As shown, the reference, in this case scale 33, may be placed partially over the component to maximize the amount of the image taken up by the component of interest without obscuring significant dimensional points of the component. This may be advantageous because the camera can then zoom in closer or move closer for an image than if the reference was placed wide of the component.

Referring to FIG. 3, in some embodiments each of the one or more images have a reference set of points visible, for example defined by corners 40a, 40b, 40c, and 40d, of reference object 32, that define at least three converging reference dimensions 42a, 42b, and 42c, of the reference object 32. It should be understood that different images may have different reference points visible, for example if images are taken of the feature and reference from different sides. The three converging reference dimensions may be used to establish a suitable relative X, Y, and Z reference axis from which dimensions of the feature may be derived.

Figure 6:
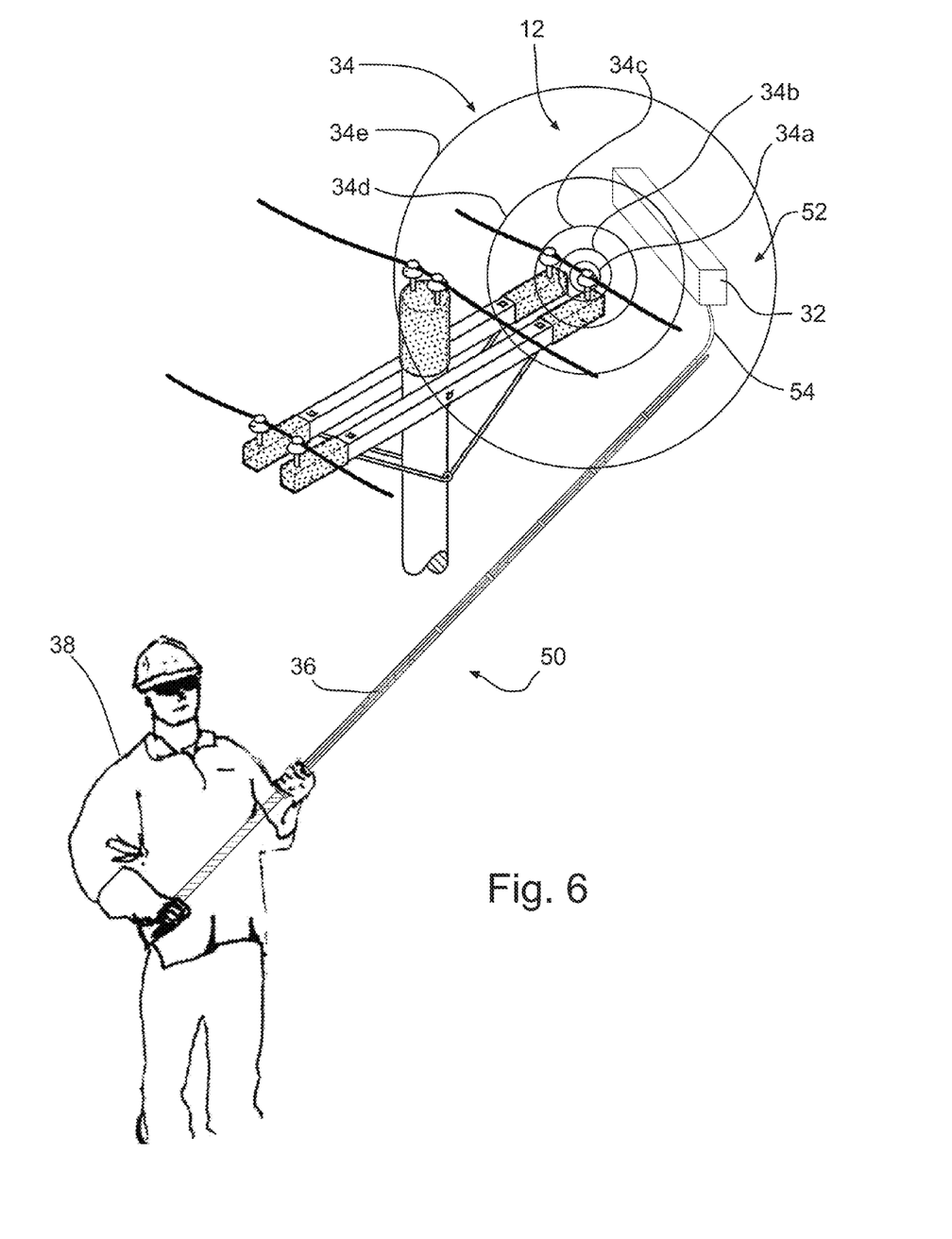
FIG. 6 is a perspective view of a worker remotely placing a reference object in the vicinity of a component to be measured from a position outside the limits of approach.

Referring to FIG. 6, in some embodiments, the method may further comprise remotely placing the reference object 32 in the vicinity, for example in close enough proximity for a suitable image to be acquired, of the component 12. In some embodiments such as those illustrated in stage 106 of FIG. 8 (discussed more below) the reference object 32 may be remotely placed into a position inside a safe Limit of Approach 34e when the electrical transmission system is energized. As is illustrated in FIG. 6, in these embodiments remote placing of the reference object 32 may be done, for example using a dielectric hot stick 36, by a user 38 who is in a position outside of a safe limit of approach 34, for example limit of approach 34e. This allows reference object 32 to be safely placed within the limits of approach. Standard limits of approach are generally set by the IEEE for live electrical systems. It should be understood that the limits of approach may vary according to region. The limits of approach 34 around energized equipment generally widens as the voltage increases. In the illustration of FIG. 6, the limits of approach 34 correspond to increasing voltages, and thus increasing radii, from limits of approach 34a-34e. For this purpose, hot stick 36 may be provided in a length that is suitable for the various limits of approach standards in all jurisdictions. Referring to FIG. 9, other suitable placement techniques may be used, for example, anchoring, magnetic attachment, adhesive attachment, and attachment to a live-line tool, including suspending, which is shown using a hot stick 36. Suspending may also be done using a cable or bracket (not shown). Remotely placing may include depositing the reference object to rest in position. In some embodiments, the component comprises non-energized, for example grounded, electrical equipment that is located in close proximity to energized equipment and thus lies within the Limit of Approach of the adjacent energized equipment.

In some embodiments, the imaging stage may be carried out when the system is energized, for example by an imaging device within a safe limit of approach, for example for acquiring a close-up image of a component. Referring to FIG. 9, in further embodiments, the imaging device may be operated remotely, using for example a telepole or hotstick 11, although this is not required in all embodiments. In other embodiments, imaging may be carried out outside a safe limit of approach.

A user such as a utility company may acquire the required images and transmit them to a separate company who analyzes the images and selects/makes the protector.

Referring to FIG. 5, in a stage 102 (shown in FIG. 7), the one or more images 16 are analyzed with a photogrammetry algorithm, for example stored on a computer workstation 20, to measure the feature of the component 12. Photogrammetry is the technique of measuring and modeling objects from photos. Stage 102 may be accomplished using suitable photogrammetry software, for example commercially available software, using for example a computer or other suitable device. In some embodiments, this stage may be carried out by a human, for example at least in part by hand. For example, a skilled worker may analyze printed photos using a suitable algorithm to determine the required measurements. Selection of the dimensions of the component to be measured may be carried out using human input. For example, a user may select an appropriate dimension or dimensions from each image to be measured by the software.

In some embodiments, at least one aspect of the method may be done remotely, for example wirelessly. For example, the one or more images may be transmitted to a remote site for stage 102 to be carried out at. For further example, images 16*a*, 16*b*, and 16*c* may be transmitted via a transmitter 21, such as a radio transmitter located for example in camera 14, to a receiver 23, located for example as part of workstation 20. Other suitable mechanisms of transporting relevant information such as images 16 to the workstation 20 may be used, for example internet transmission, email, disk transfer, USB drive transfer, and mail service to name a few. If images are received in a printed form, they may be scanned and uploaded prior to analysis.

The workstation may have a suitable output (not shown) for outputting the calculated measurements of the feature. For example, a screen or printout may output the measurements. The measurements may be transmitted to a relevant entity for using the measurements, for example emailed to a storage facility who then selects a suitable cover in stock that will fit the component. In other embodiments such as the one shown, workstation 20 may output the results to, for example, a 3-dimensional fabrication apparatus 25 that can automatically fabricate, for example, the cover 22 or a mold for the cover 22 from the output of the photogrammetry analysis. Automatic fabrication apparatus such as these are known. In these and other embodiments, the measurements of the feature may include for example a virtual model of the feature, for further example stored in CAD format. It should be understood that some embodiments of FIG. 5 include various other steps and/or components not explicitly recited, for example a spray-molding step.

Figures 4, 4A:
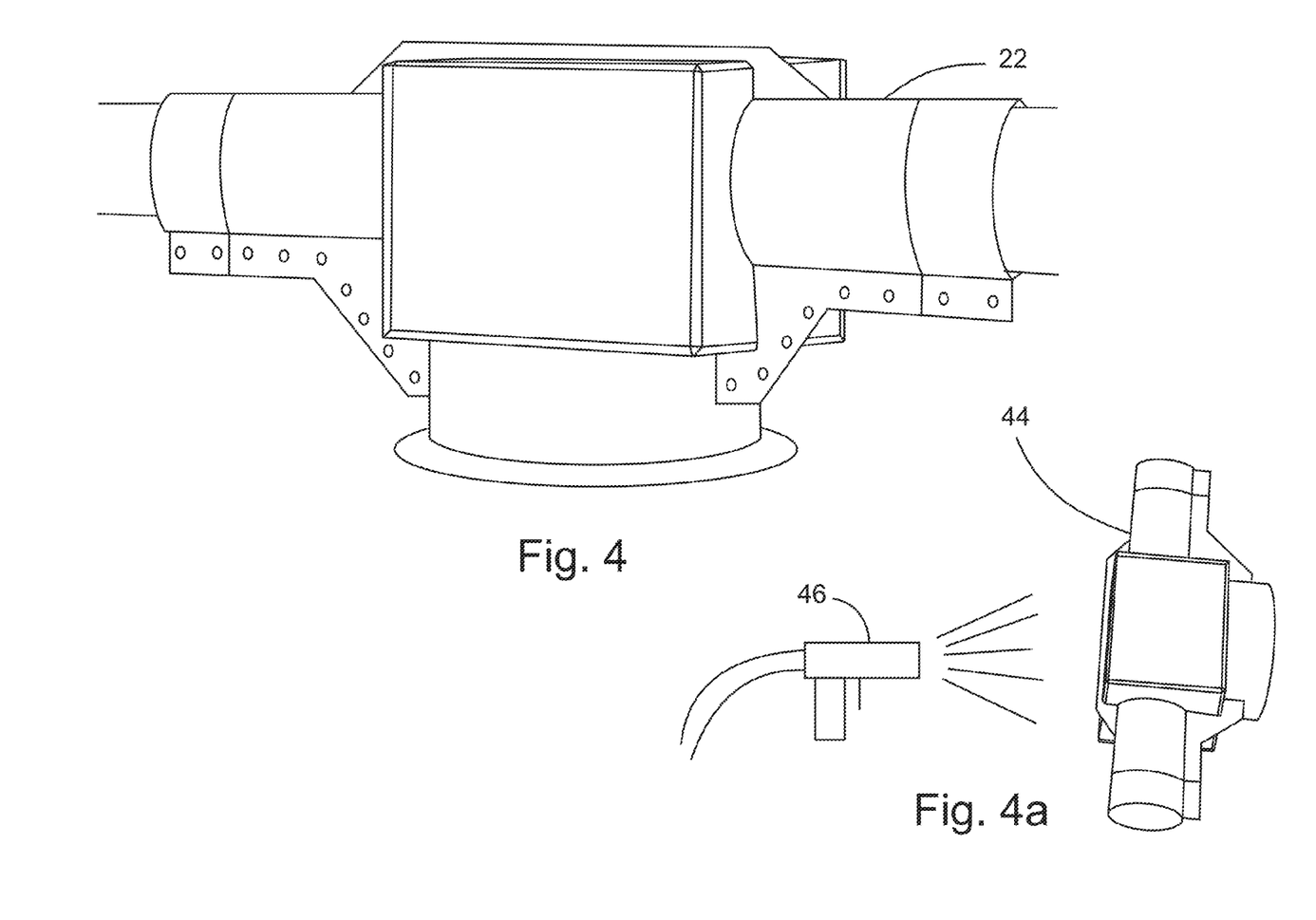
FIG. 4 is a perspective view of the component of FIG. 3 fitted with a dielectric protector.
FIG. 4a is a perspective view of the protector of FIG. 4 being made, in this case spray-molded.

At least the feature, and in some embodiments the entire component, may be measured. A suitable number of dimensions may be measured, for example one or more dimensions, in order to adequately measure the feature for the selected purpose. Exemplary dimensions include curved dimensions, straight dimensions, and distances of separation. Referring to FIG. 3, in some embodiments, the measurement of the feature, in this case a bus support 28 of a fixed bus 30, comprises a multi-dimensional measurement, for example measurement of dimensions 26A-G Referring to FIG. 5, in a stage 104 (shown in FIG. 7), a protector, for example a cover 22 (shown for example as a teacup cover), is placed, for example when the system is energized or powered down, at least partially over the component 12, the protector being selected to fit the component 12 based on the measurement of the feature 10 from stage 102. Referring to FIG. 4*a*, in some embodiments, the protector is first made, for example by spray molding, based on the measurement of the feature. FIG. 4*a* illustrates a mold 44, made by any suitable means according to the measured feature of FIG. 3, being coated by spray apparatus 46 to make protector 22 (shown in FIG. 4). Other suitable methods of fabricating the protector may be used such as injection moulding, especially when a large number of the components are to be made. Fabrication of the protector may be done with techniques that are carried out with one or both human and machine effort. The protector may be made of dielectric material, for example plural coats of polyurethane resin.

Figure 8:
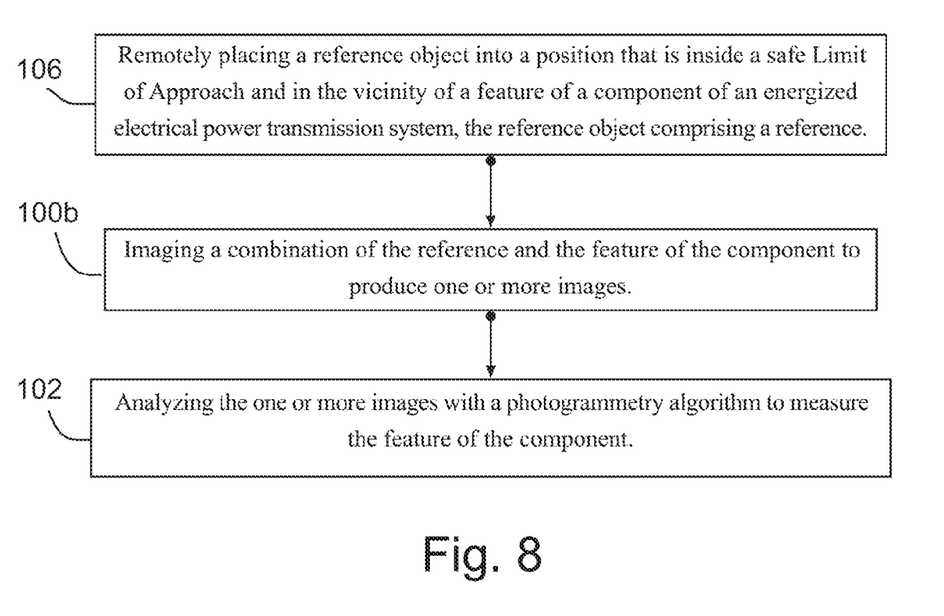

Referring to FIG. 8, a method of measuring a feature of a component of an energized electrical power transmission system is illustrated. Referring to FIG. 3, in a stage 106 (shown in FIG. 8), a reference object 32, is remotely placed into a position that is inside a safe Limit of Approach 34*b* and in the vicinity of a feature, for example a support 28, of a component 12, for example a bus 30, of an energized electrical power transmission system. As described elsewhere in this document and as shown in FIG. 3, the component itself need not be directly energized, as the limits of approach 34*a-c* emanate from an energized feature (not shown) that is to the left of the bus 30 and out of the field of view of image 16. The limits of approach 34*a-c* are illustrated by ghost lines and are understood to be imaginary boundaries that do not actually appear in the image 16. The reference object 32 comprises a reference. This stage may be carried out for example according to any of the embodiments disclosed in this document. In a stage 100*b* (shown in FIG. 8) a combination of the reference and the feature of the component 12 are imaged to produce one or more images. As disclosed above, FIG. 3 illustrates the field of view of one such image 16. This stage may be carried out for example according to any of the embodiments disclosed in this document, for further example similar to stage 100 (shown in FIG. 7) for example. Next, in stage 102 (shown in FIG. 8), the one or more images is analyzed with a photogrammetry algorithm, for example in a manner similar to any of the embodiments disclosed in this document, to measure the feature of the component. This method is advantageous, because it may be used to accurately measure a feature of an energized electrical system, without powering down the system. Thus, improved electrical grid performance, reduced downtime losses, and faster deployment of protective covers (no waiting for scheduled downtime needed for measurements) may be achieved.

It should be understood that various of the embodiments disclosed herein may be used in any of the other embodiments disclosed herein. In some embodiments, these methods are used systematically to measure the features of more than one selected component of an electrical power transmission system. In some cases all the selected components of the system are imaged. In these embodiments, multiple imaging steps may be carried out on different features, with the one or more images corresponding to each feature categorized in respective photo sets. The same reference object may be used for the imaging of different features. The photo sets are then analyzed and the corresponding protectors may be made and/or selected. Similarly, installation of all the protectors may be carried out afterwards. Photogrammetric measurements are advantageous because they allow the precise measurement of energized electrical equipment and electrical equipment located in close proximity to energized equipment by a user located safely outside the Limits of Approach, using an imaging device that may be located either within or outside the Limits of Approach. Thus, measurements of an electrical system may be made without powering down the electrical system, thus reducing the cost and complexity associated with measuring the electrical system for protective covers. Precise measurements may also be made for a component of a non-energized system or a component that is located outside the safe limits of approach.

It should be understood that some stages, such as at least one of the remote placement and imaging stages may be completed under the direction of an entity who completes the rest of the stages of the methods disclosed herein. For example, the company who photogrammetrically measures the feature and makes and installs the cover may have a utility company take images of the feature first.

Referring to FIG. 6, an apparatus 50 is illustrated for remote placement of a reference into the vicinity of feature of a component 12 of an energized electrical power transmission system for imaging the reference and the feature for photogrammetric analysis of the feature. Apparatus 50 includes a hot stick, for example hot stick 36, made at least in part of a dielectric material, and a reference object, for example object 32, connected to a reference end 52 of the hot stick 36, the reference object 32 comprising the reference. As illustrated, the hot stick 36 may be telescopic to allow a broad range of elevated or awkwardly located components to be reached. Other embodiments of apparatus 50 are illustrated throughout this document. The object 32 may be connected to reference end 52 by a suitable mechanism, for example a hook 54 as shown. Dielectric material may be used in any part of apparatus 50 in order to avoid the possibility of shunting out energized elements while placing or moving the object 32. It may be advantageous to make the object lightweight and compact for portability, yet not easily dislodged by wind.

General photogrammetric principles and techniques are well understood, and thus are not repeated in exhaustive detail herein. It should be understood that a suitable imaging device, for example a video camera, digital camera, or analog camera, may be used, and further a suitable format of images may be analyzed, for example analog or digital photos. In other embodiments of the methods disclosed herein, a camera that is at least one of calibrated and of fixed focal length may be used. The one or more images make up a photo set.

Protectors include for example bushing covers, bus covers, insulator covers, lightning arrestor covers, wildlife discs, teacups, channel covers, conductor accessories, connector covers, CT covers, structure covers, underground terminator covers, substation covers, distribution line covers, dead end covers, pin insulator covers, underground transformer covers, support structure covers, pole top transformer bushing covers, cutout covers, custom covers, blanket covers, sleeves, lip clips, arm guards, regulator covers, and other suitable protectors.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A method comprising:
   remotely placing a reference object into a position that is inside a safe Limit of Approach and in the vicinity of plural features of a component of a substation, which is energized, in an electrical power transmission system, the reference object incorporating a scale, the reference object being placed inside the safe Limit of Approach by a user with a first hot stick who is in a position outside the safe Limit of Approach;
   remotely imaging, with an imaging device mounted on a second hot stick, a combination of the reference and the plural features of the component to produce one or more images, in which remotely imaging is carried out with both the second hot stick and the imaging device positioned within the substation;
   transmitting the one or more images to a remote site for analyzing and storing the one or more images on one or more computers;
   analyzing, with the one or more computers, the one or more images with a photogrammetry algorithm to measure the plural features of the component to a degree sufficient to make a dielectric protector that fits the component;
   making a dielectric protector that fits the component, based on the measurement of plural features of the component; and
   placing the dielectric protector at least partially over the component to produce a protected component;
   in which the component is a piece of electrical substation equipment.

2. The method of claim 1 in which the reference object comprises a clearance stick.

3. The method of claim 1 in which remotely imaging comprises producing two or more images, in which the reference object and the component have the same position relative to one another when each of the two or more images are taken.

4. The method of claim 1 in which, while remotely imaging, the second hot stick and imaging device are outside of a safe Limit of Approach.

5. The method of claim 1 in which the component is a bushing, bus, insulator, lightning arrestor, pole, channel, conductor accessory, connector, transformer, current transformer (CT), underground terminator, distribution line, dead end, pin insulator, underground transformer, support structure, pole top transformer bushing, cutout, lip, arm, pipe, or regulator.

* * * * *